United States Patent
Fullerton

(10) Patent No.: US 10,512,218 B2
(45) Date of Patent: Dec. 24, 2019

(54) MOWER HAVING COLLECTION SYSTEM WITH QUICK CONNECT VACUUM HOSE ADAPTER

(71) Applicant: Bruce Fullerton, Superior, NE (US)

(72) Inventor: Bruce Fullerton, Superior, NE (US)

(*) Notice: Subject to any disclaimer, the term of this patent is extended or adjusted under 35 U.S.C. 154(b) by 72 days.

(21) Appl. No.: 15/685,900

(22) Filed: Aug. 24, 2017

(65) Prior Publication Data

US 2018/0054965 A1    Mar. 1, 2018

Related U.S. Application Data

(60) Provisional application No. 62/379,585, filed on Aug. 25, 2016.

(51) Int. Cl.
| | | |
|---|---|---|
| *A01D 43/063* | (2006.01) | |
| *A01D 43/077* | (2006.01) | |
| *F16L 37/096* | (2006.01) | |
| *F16L 37/086* | (2006.01) | |
| *F16L 3/12* | (2006.01) | |
| *A01D 101/00* | (2006.01) | |

(52) U.S. Cl.
CPC ......... *A01D 43/063* (2013.01); *A01D 43/077* (2013.01); *F16L 3/1222* (2013.01); *F16L 37/086* (2013.01); *F16L 37/096* (2013.01); *A01D 2101/00* (2013.01)

(58) Field of Classification Search
CPC . F16L 23/06; F16L 21/06; F16L 21/08; F16L 17/04; F16L 27/1017; F16L 27/113; F16L 33/03; F16L 33/12; F16L 21/002; F16L 37/20; F16L 3/1222; F16L 37/086; F16L 37/096; F16L 33/00; A01D 43/063; A01D 43/077; A01D 2101/00
See application file for complete search history.

(56) References Cited

U.S. PATENT DOCUMENTS

| | | | | | |
|---|---|---|---|---|---|
| 3,776,579 | A | * | 12/1973 | Gale | F16L 27/113 285/233 |
| 3,934,392 | A | * | 1/1976 | Moery | A01D 43/063 56/202 |
| 3,999,825 | A | * | 12/1976 | Cannon | F16L 23/06 439/192 |

(Continued)

FOREIGN PATENT DOCUMENTS

CN        205371897 U  *  7/2016   ............. F16L 33/03

*Primary Examiner* — Arpad Fabian-Kovacs
(74) *Attorney, Agent, or Firm* — Jeffrey L. Thompson; Thompson & Thompson, P.A.

(57) ABSTRACT

A quick connect hose adapter connects a flexible transfer hose from a mower deck to an inlet tube on a container for storing debris. The adapter includes a first cylindrical portion fixed in the discharge end of the flexible hose, and a second portion with a clamp assembly that clamps to the inlet tube. The clamp assembly has first and second semi-cylindrical segments connected together on one side by a continuous hinge, and at least one latch for latching the other side of the semi-cylindrical segments together to cause the clamp assembly to be clamped to the inlet tube. When the latch is released, the second semi-cylindrical segment can be moved from a closed position to an open position. In the open position, the adapter is easily removable from the inlet tube. A seal ring provides a smooth inner surface and seal between the adapter and the inlet tube.

18 Claims, 7 Drawing Sheets

(56) References Cited

U.S. PATENT DOCUMENTS

| | | | |
|---|---|---|---|
| 4,008,937 A * | 2/1977 | Filippi | F16L 23/06 174/78 |
| 4,346,428 A * | 8/1982 | Gale | F16L 25/01 174/47 |
| 4,438,958 A * | 3/1984 | De Cenzo | F16L 21/06 174/94 S |
| 4,532,755 A * | 8/1985 | Schemelin | A01D 43/063 56/16.6 |
| 4,709,541 A * | 12/1987 | Broman | A01D 43/0638 298/11 |
| 4,711,073 A * | 12/1987 | Freier, Jr. | A01D 43/077 56/13.3 |
| 4,881,362 A * | 11/1989 | Parker | A01D 43/077 56/202 |
| 5,036,650 A * | 8/1991 | Tesch | A01D 43/06 56/16.6 |
| 5,375,399 A * | 12/1994 | Kraft | A01D 34/005 15/347 |
| 5,620,210 A * | 4/1997 | Eyster | F16L 21/06 24/625 |
| 6,758,500 B2 * | 7/2004 | Lehnhardt | F16L 21/06 285/111 |
| 6,880,859 B2 * | 4/2005 | Breay | F16L 21/06 285/1 |
| 7,445,252 B2 * | 11/2008 | Ho | F16L 23/06 285/407 |
| 8,075,024 B2 * | 12/2011 | Wern | F16L 25/01 285/364 |
| 8,171,603 B2 * | 5/2012 | Nakamura | F16L 33/03 24/20 CW |
| 9,261,211 B2 * | 2/2016 | Schooley | F16L 25/01 |
| 9,599,262 B1 * | 3/2017 | Moore | F16L 27/1017 |
| 2002/0138939 A1 * | 10/2002 | Smith | E01H 1/047 15/340.4 |
| 2004/0221563 A1 * | 11/2004 | Funk | A01D 43/063 56/202 |
| 2006/0272309 A1 * | 12/2006 | Moore | A01D 43/063 56/202 |
| 2011/0037250 A1 * | 2/2011 | Bowman | F16L 17/04 285/110 |
| 2015/0237800 A1 * | 8/2015 | DeHart | A01D 43/06 56/202 |
| 2018/0054966 A1 * | 3/2018 | Volovsek | A01D 43/0636 |

* cited by examiner

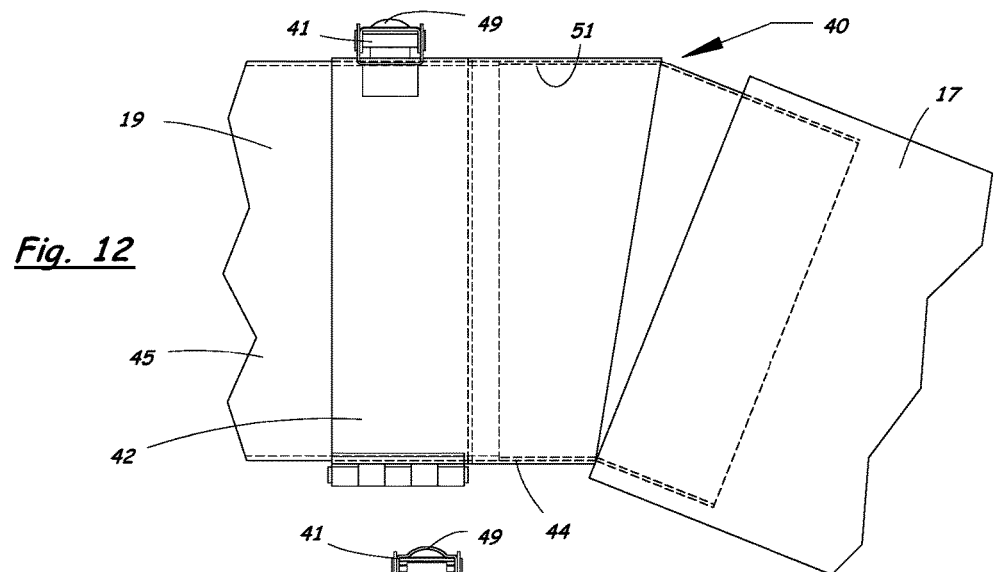
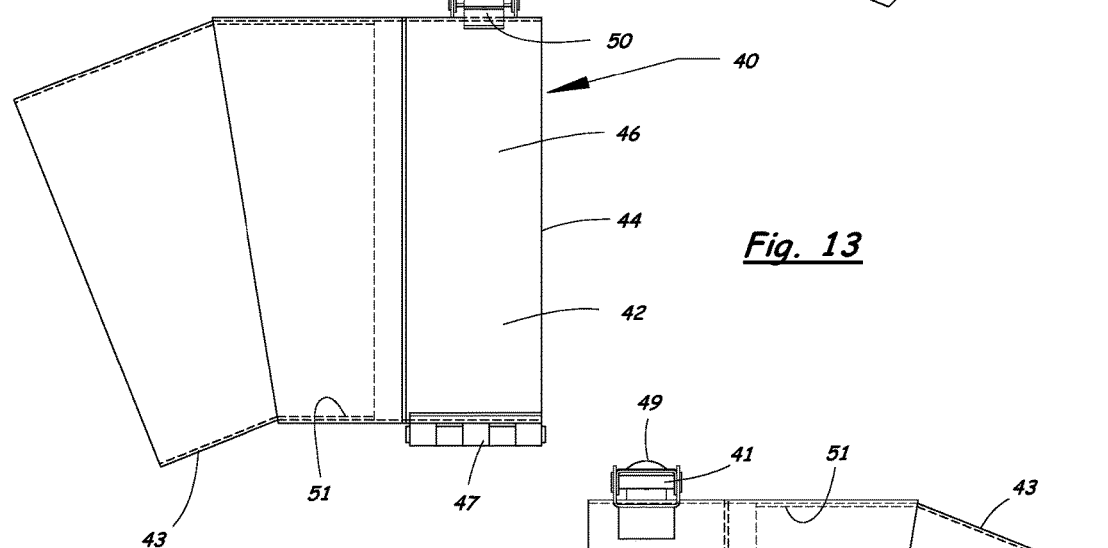
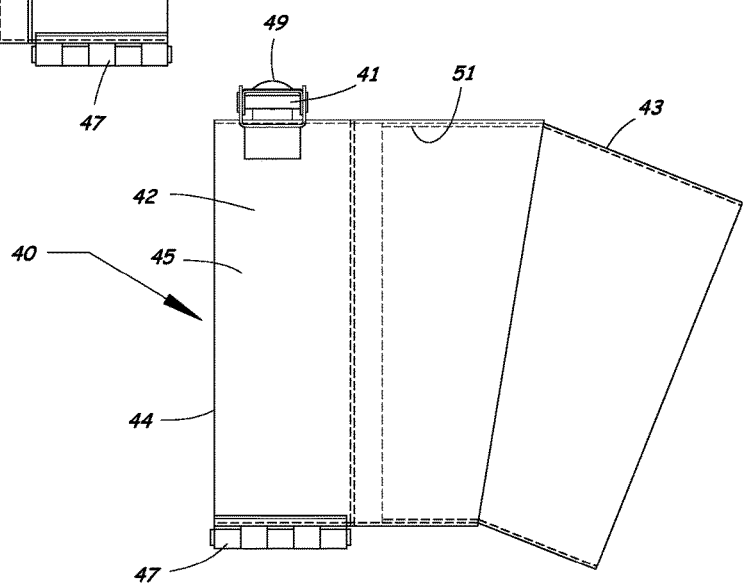

MOWER HAVING COLLECTION SYSTEM WITH QUICK CONNECT VACUUM HOSE ADAPTER

RELATED APPLICATION

This application claims the priority benefit of U.S. Provisional Patent Application No. 62/379,585 filed on Aug. 25, 2016. The entire content of this prior application is incorporated herein by reference.

BACKGROUND OF THE INVENTION

Field of the Invention

The present invention relates generally to mowers having collection systems for collecting grass clippings, leaves and other debris, and in particular, to a device for connecting a flexible transfer hose to a container of such a collection system.

Description of the Related Art

Mowers with collection systems for collecting grass clippings, leaves and other debris are known in the prior art. For example, the PowerVac™ Collection System by The Grasshopper Company of Moundridge, Kans., includes a container mounted on the rear of the mower, a blower with an impeller for reducing and compacting debris discharged by the mower deck, and a flexible transfer hose that extends between the blower and the container. The mower deck discharges debris to the blower, which conveys the debris through the flexible transfer hose into the container.

The flexible transfer hose is connected to an inlet tube on the container. The transfer hose is held in place on the inlet tube by a hose clamp extending around an outer surface of the hose. During use, it is sometimes necessary to remove the transfer hose from the inlet tube on the container. The hose clamp must be loosened, and then the hose must be pulled with enough force to overcome the friction between the inner surface of the hose and the outer surface of the inlet tube. This process is time consuming, sometimes difficult, and often results in damage to the hose.

There is a need for an improved system for attaching the transfer hose to the inlet tube of the container of the collection system.

SUMMARY OF THE INVENTION

An object of the present invention is to provide an improved system for attaching a flexible transfer hose to an inlet tube on a container of a collection system, which allows the hose to be quickly and easily removable from the inlet tube without damaging the hose.

A further object of the present invention is to provide a quick connect adapter that can be retrofit to an existing transfer hose to provide a quick connect system for attaching the transfer hose to a container of a collection device.

A further object of the present invention is to provide a quick connect adapter for a collection system of a mower that is inexpensive to manufacture, that provides an effective seal between the transfer hose and the inlet tube, that is durable in use and capable of a long operating life, and that allows a transfer hose to be quickly and easily removed and reattached to an inlet tube of the collection system.

These and other objects of the present invention are accomplished by a quick connect hose adapter that connects a flexible transfer hose from a mower deck to an inlet tube on a container for storing debris. The adapter includes a first cylindrical portion fixed in the discharge end of the flexible hose, and a second portion with a clamp assembly that clamps to the inlet tube. The clamp assembly has first and second semi-cylindrical segments connected together on one side by a continuous hinge, and at least one latch for latching the other side of the semi-cylindrical segments together to cause the clamp assembly to be clamped to the inlet tube. When the latch is released, the second semi-cylindrical segment can be moved from a closed position to an open position. In the open position, the adapter is easily removable from the inlet tube. A seal ring provides a smooth inner surface and seal between the adapter and the inlet tube. The first and second portions of the adapter can be disposed at an angle to accommodate an angle of the inlet tube and reduce stress on the flexible hose.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 12 is a bottom view of the quick connect adapter connecting a transfer hose to an inlet tube of a container.

FIG. 13 is a top view of the quick connect adapter.
FIG. 14 is a bottom view of the quick connect adapter.

DETAILED DESCRIPTION OF THE INVENTION

A mower 10 having a quick connect hose adapter 11 according to the present invention will now be explained in detail with reference to FIGS. 1 to 14 of the accompanying drawings.

Figure 1:
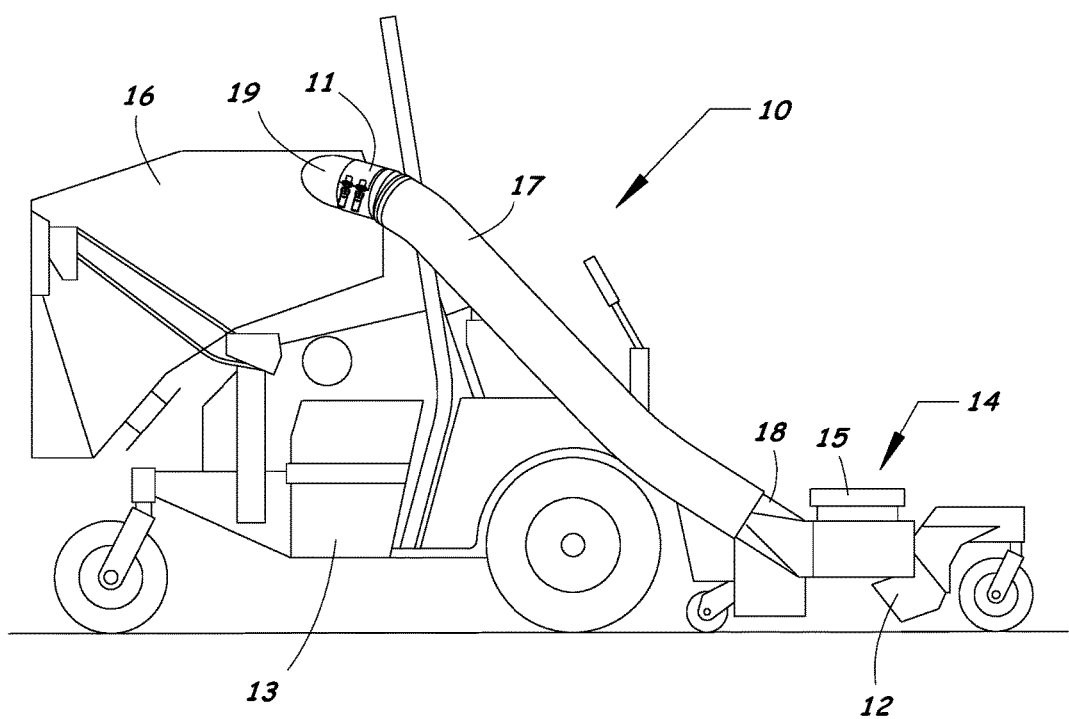
FIG. 1 is an elevation view of a mower having a collection system equipped with a quick connect adapter of the present invention.
Figure 2:
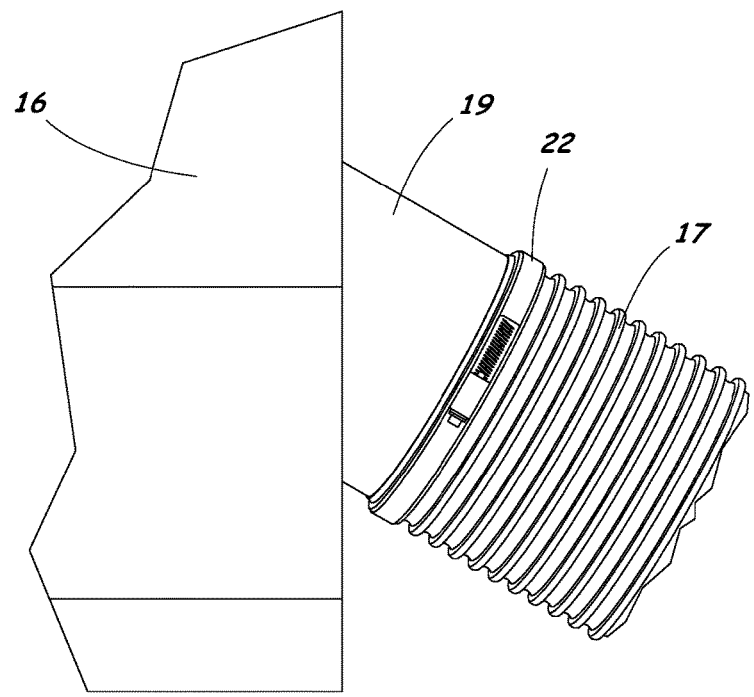
FIG. 2 shows a conventional system for attaching a flexible transfer hose to an inlet tube of a container of a collection system of a mower.

The mower 10 illustrated in FIG. 1 includes a mower deck 12 mounted on the front of a wheeled vehicle 13. However, it should be understood that the adapter 11 of the present invention can also be used with a mower having the mower deck mounted at a midpoint between the front and rear wheels of the vehicle.

A collection system 14 is provided for collecting grass clippings, leaves and other debris discharged from the mower deck 12. The collection system 14 includes a blower 15 mounted on the mower deck 12 with an impeller for reducing and compacting debris discharged from the mower deck 12. A container 16 is mounted on the rear of the mower 10 to hold the collected debris until it is emptied at a desired location. A flexible transfer hose 17 extends from an outlet tube 18 on the blower 15 to an inlet tube 19 on the container 16. The transfer hose 17 is flexible to accommodate relative movement between the mower deck 12 and the container 16 during operation.

The quick connect hose adapter 11 is provided for connecting the transfer hose 17 to the inlet tube 19 on the container 16. The adapter 11 has a first cylindrical portion 20 which is fixed in the discharge end 21 of the hose 17 by a hose clamp 22 extending around an outer surface of the hose 17. The first cylindrical portion 20 has the same outer diameter as the inlet tube 19 on the container 16.

The adapter 11 has a second portion 23 that comprises a clamp assembly 24 for clamping to the inlet tube 19 on the container 16. The clamp assembly 24 includes first and second semi-cylindrical segments 25, 26 that are connected together on one side by a hinge 27. For example, the hinge 27 can be a continuous hinge, which is also known as a piano hinge.

The first semi-cylindrical segment 25 is fixed relative to the first cylindrical portion 20. The second semi-cylindrical segment 26 is pivotal relative to the first semi-cylindrical segment 25 about an axis of the hinge 27 that extends parallel with a longitudinal axis of the clamp assembly 24 and the inlet tube 19. The second semi-cylindrical segment 26 can thus be moved between a first closed position (FIG. 6) in which the first and second semi-cylindrical segments 25, 26 are fit snugly around the outer surface of the inlet tube 19, and a second open position (FIG. 7) in which one side of the first and second semi-cylindrical segments 25, 26 are separated from each other to allow the adapter 11 to be removed from the inlet tube 19. In the first closed position, the second portion 23 of the adapter 11 has approximately the same inner diameter as the inner diameter of the transfer hose 17.

Figure 3:
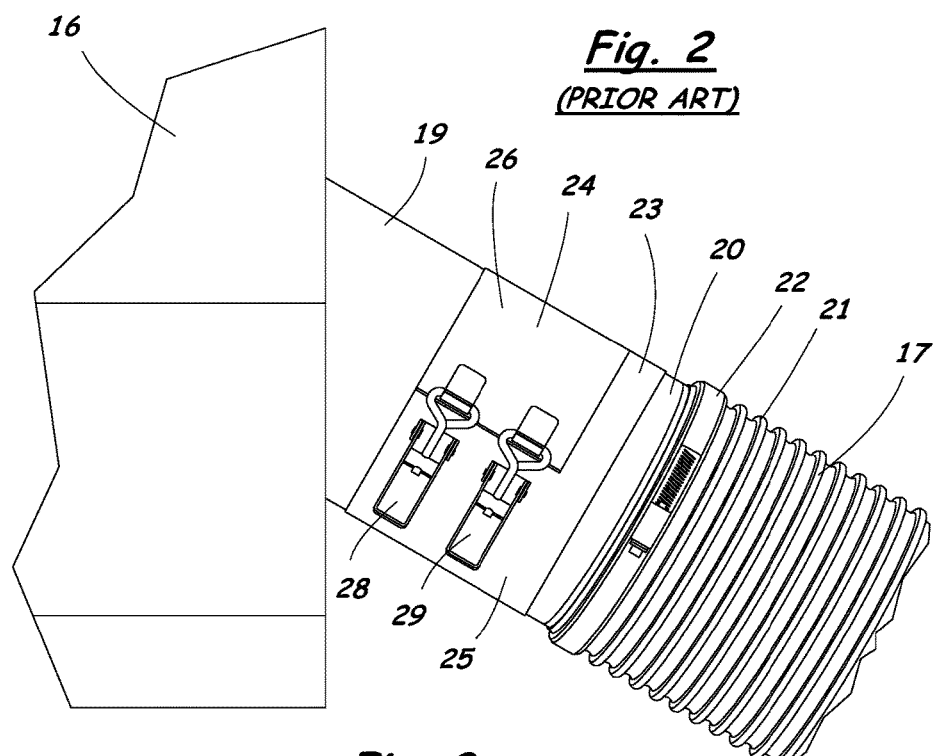
FIG. 3 shows the quick connect adapter of the present invention being used to attach the flexible transfer hose to the inlet tube of the collection system container.
Figure 4:
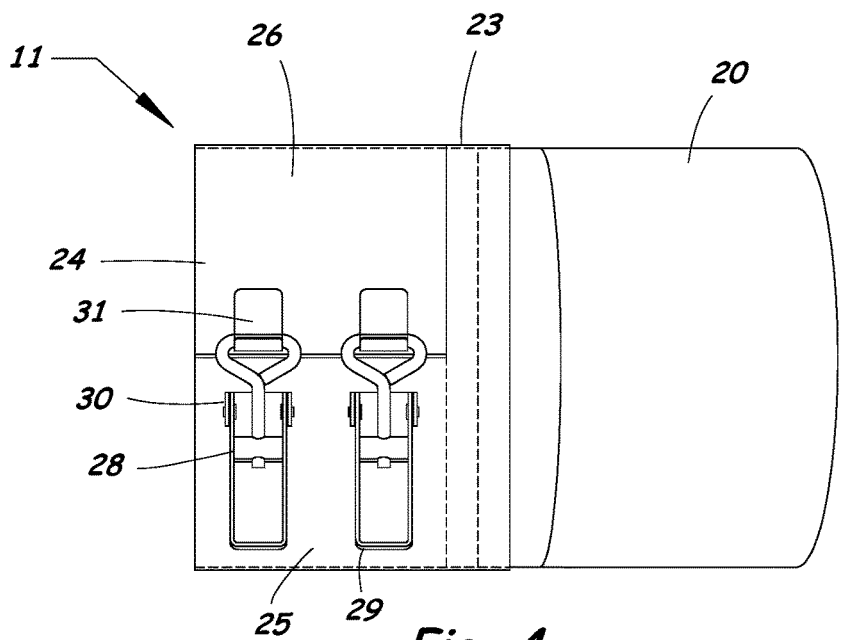
FIG. 4 is a plan view of the quick connect adapter of the present invention.
Figure 5:
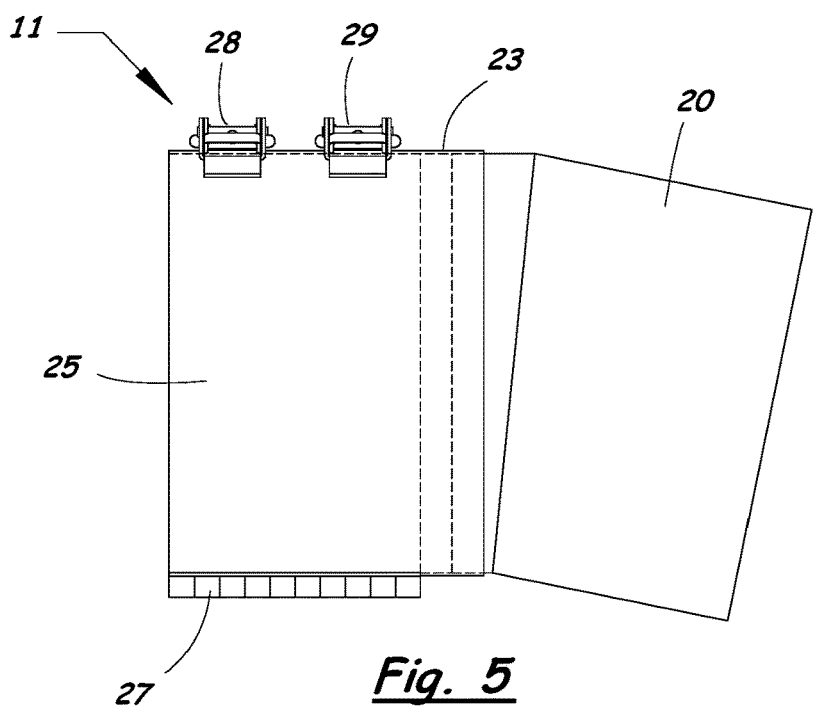
FIG. 5 is a bottom view of the quick connect adapter.
Figure 6:
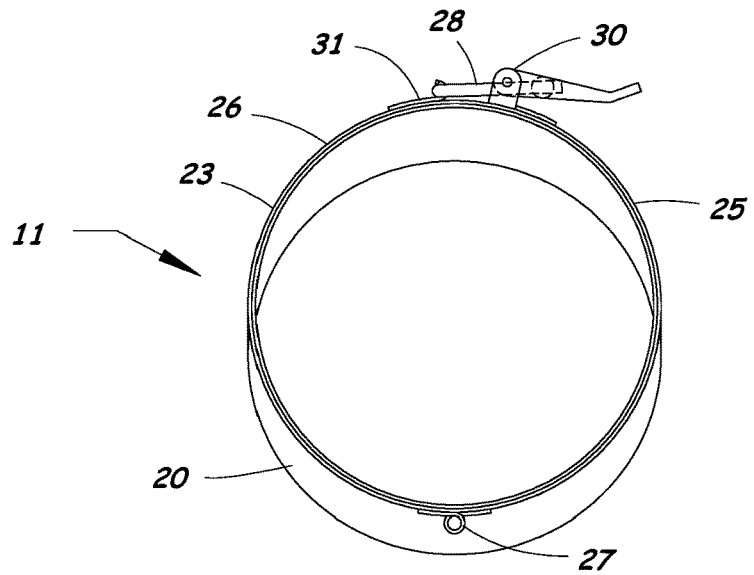
FIG. 6 is a rear view of the quick connect adapter with the latch in a clamped position.
Figure 7:
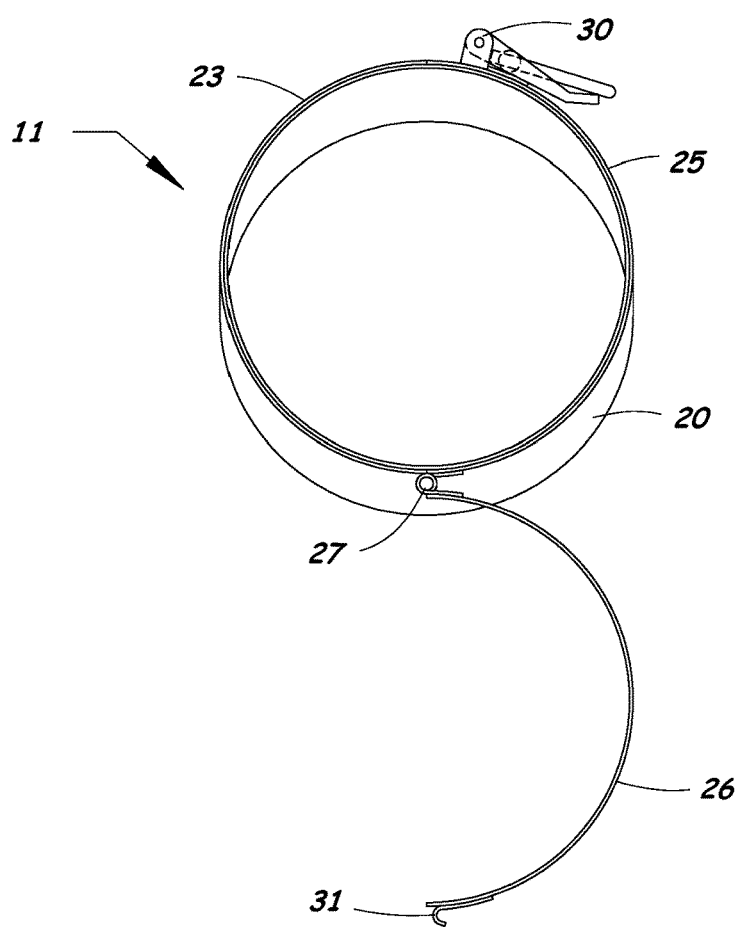
FIG. 7 is a rear view of the quick connect adapter with the latch in a released position.
Figure 8:
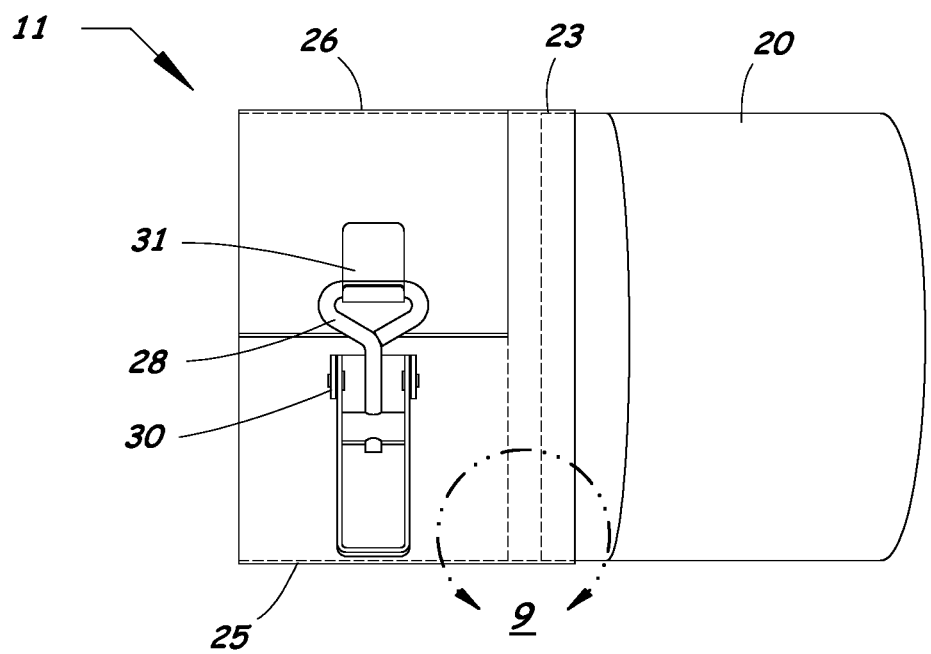
FIG. 8 is an elevation view of a quick connect adapter according to another embodiment of the present invention.
Figure 9:
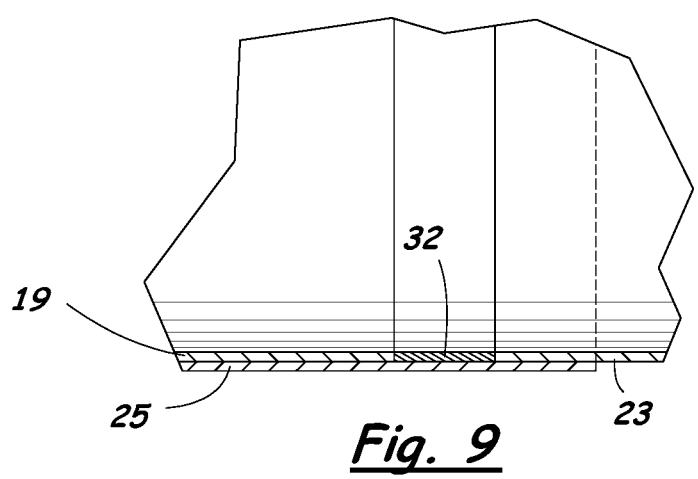
FIG. 9 is a cross sectional detail view of the portion of the quick connect adapter indicated by line 9 in FIG. 8.
Figure 10:
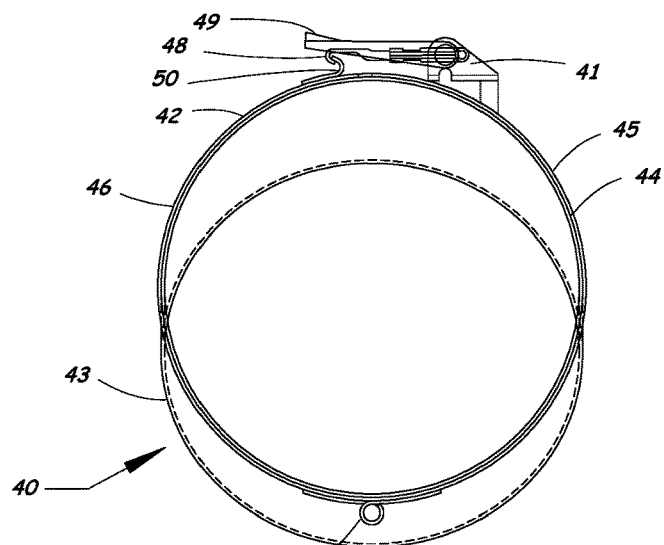
FIG. 10 is a rear view of a quick connect adapter according to another embodiment of the invention with the latch in a clamped position.
Figure 11:
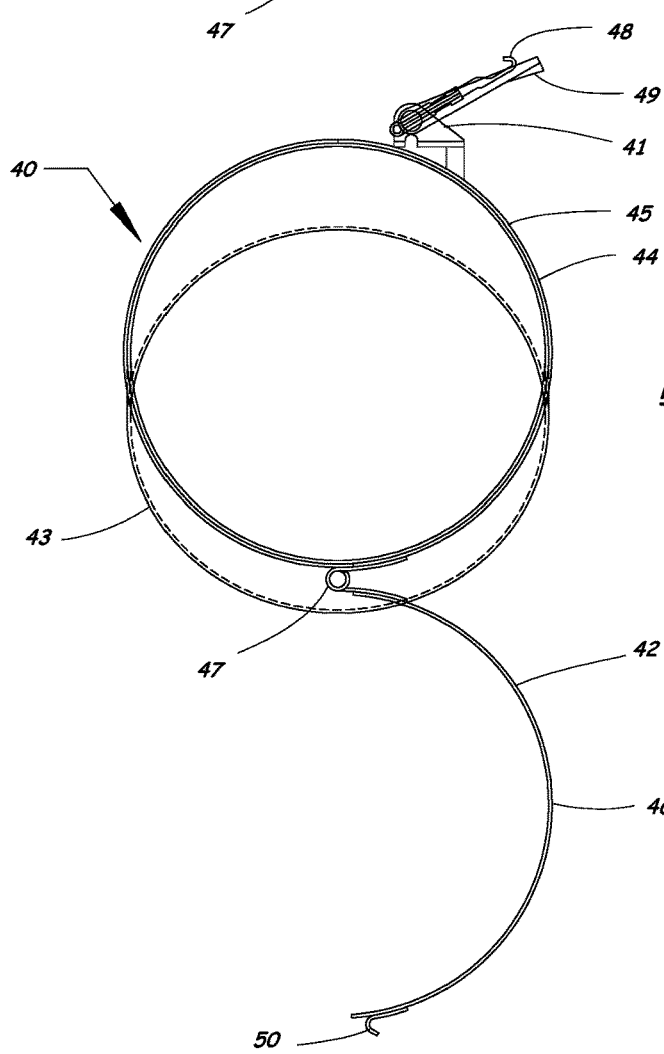
FIG. 11 is a rear view of the quick connect adapter shown in FIG. 10 with the latch in a released position.

The first and second semi-cylindrical segments 25, 26 are latched together by at least one latch 28 on a side opposite from the hinge 27 to cause the second portion 23 of the adapter 11 to be clamped over an outer surface of the inlet tube 19. The latch 28 is preferably a snap down toggle style latch. In one embodiment, as illustrated in FIGS. 3 to 5, a pair of latches 28, 29 are arranged side-by-side to latch the first and second semi-cylindrical segments 25, 26 together to cause the clamp assembly 24 to be clamped to the inlet tube 19. In another embodiment, as illustrated in FIG. 8, a single latch 28 is used to latch the first and second semi-cylindrical segments 25, 26 together.

Each of the latches 28, 29 includes a first latch structure 30 connected to one of the semi-cylindrical segments 25, and a second latch structure 31 connected to the other one of the semi-cylindrical segments 26. In the illustrated embodiment, the first latch structure 30 comprises a clamping member, and the second latch structure 31 comprises a catch bracket. The first and second latch structures 30, 31 are adapted to be mated together. The first latch structure 30 is moveable between a first clamped position and a second released position. In the first clamped position, the first latch structure 30 is in an over-center condition to hold the clamp assembly 24 closed. In the second released position, the clamp assembly 24 can be opened and the adapter 11 can be easily removed from the inlet tube 19 on the container 16.

A seal ring 32 is connected to an inner surface of the adapter 11 to create a smooth inner surface and a seal between the adapter 11 and a front peripheral edge of the inlet tube 19. The seal ring 32 abuts against the inlet tube 19 on the container 16 when the adapter 11 is connected to the inlet tube 19.

As illustrated in FIG. 5, the second portion 23 of the adapter 11 is disposed at an angle relative to the first cylindrical portion 20 to accommodate an angle of the inlet tube 19 on the container 16. For example, an angle of 11 to 12 degrees can be provided between the first cylindrical portion 20 and the second portion 23 of the adapter 11 to accommodate the angle of the inlet tube 19 and to reduce stress on the flexible transfer hose 17.

FIGS. 10 to 14 illustrate a quick connect hose adapter 40 according to another embodiment of the invention. The adapter 40 is similar to the adapter 11 illustrated in FIGS. 1 and 3 to 7, except that a different type of latch 41 is used, and the clamp assembly 42 is shorter to allow the adapter 40 to be used with a wider variety of inlet tubes 19 and containers 16. The following will provide a detailed description of the adapter 40, including some of the features that are common to both the adapter 11 and the adapter 40.

The adapter 40 is provided for connecting the transfer hose 17 to the inlet tube 19 on the container 16. The adapter 40 has a first cylindrical portion 43 which is fixed in the discharge end 21 of the hose 17 by a hose clamp 22 (not shown in FIG. 10, but similar to the connection shown in FIG. 3). The first cylindrical portion 43 has the same outer diameter as the inlet tube 19 on the container 16.

The adapter 40 has a second portion 44 that extends at an angle to the first portion 43 to accommodate an angle of the inlet tube 19 on the container 16. For example, the second portion 44 can be disposed at an angle of approximately 10 to 20 degrees relative to the first portion 43 to accommodate the angle of the inlet tube 19 and to minimize stress on the flexible transfer hose 17.

The second portion 44 of the adapter 40 comprises the clamp assembly 42 for clamping to the inlet tube 19 on the container 16. The clamp assembly 42 includes first and second semi-cylindrical segments 45, 46 that are connected together on one side by a hinge 47. For example, the hinge 47 can be a continuous hinge, which is also known as a piano hinge.

The first semi-cylindrical segment 45 is fixed relative to the first cylindrical portion 43. The second semi-cylindrical segment 46 is pivotal relative to the first semi-cylindrical segment 45 about an axis of the hinge 47 that extends parallel with a longitudinal axis of the clamp assembly 42 and the inlet tube 19. The second semi-cylindrical segment 46 can thus be moved between a first closed position (FIG. 10) in which the first and second semi-cylindrical segments 45, 46 are fit snugly around the outer surface of the inlet tube 19, and a second open position (FIG. 11) in which one side of the first and second semi-cylindrical segments 45, 46 are separated from each other to allow the adapter 40 to be removed from the inlet tube 19. In the first closed position, the second portion 44 of the adapter 40 has approximately the same inner diameter as the inner diameter of the transfer hose 17.

The first and second semi-cylindrical segments 45, 46 are latched together by the latch 41 on a side opposite from the hinge 47 to cause the second portion 44 of the adapter 40 to be clamped over an outer surface of the inlet tube 19. The latch 41 is an adjustable toggle latch with a threaded hook 48 that can be adjusted in length relative to a handle assembly 49 to accommodate variations in the inlet tube 19 and to set a desired tension on the clamp assembly 42.

The latch 41 includes the threaded hook 48 and handle assembly 49 connected to one of the semi-cylindrical segments 45, and a catch bracket 50 connected to the other one of the semi-cylindrical segments 46. The threaded hook 48 and the catch bracket 50 are arranged to be mated together. The threaded hook 48 and handle assembly 49 are moveable between a first clamped position and a second released position. In the first clamped position, the first threaded hook 48 and handle assembly 49 are in an over-center condition to hold the clamp assembly 44 closed. In the second released position, the clamp assembly 44 can be opened and the adapter 40 can be easily removed from the inlet tube 19 on the container 16.

As shown in FIGS. 12 to 14, a seal ring 51 is provided inside the second portion 44 of the adapter 40 to create a smooth inner surface and a seal between the adapter 40 and a front peripheral edge of the inlet tube 19. The seal ring 51 abuts against the front edge of the inlet tube 19 on the container 16 when the adapter 40 is connected to the inlet tube 19. The seal ring 51 can have approximately the same inner and outer diameters as the inlet tube 19 so that it fits snugly against the inner surface of the second portion 44 of the adapter 40, and provides a substantially smooth inner surface at the interface between the front edge of the inlet tube and the rear edge of the seal ring 51 within the adapter 40.

While the invention has been described in connection with specific embodiments thereof, it is to be understood that this is by way of illustration and not of limitation, and the scope of the appended claims should be construed as broadly as the prior art will permit.

What is claimed is:

1. A mower having a collection system for collecting grass clippings, leaves and other debris, comprising:
    a mower deck;
    a container having an inlet tube;
    a flexible transfer hose that extends between the mower deck and the inlet tube on the container; and
    a quick connect hose adapter for connecting the transfer hose to the inlet tube on the container, said adapter comprising:
        a first cylindrical portion fixed in one end of the hose by a hose clamp extending around an outer surface of the hose; and
        a second portion that functions as a clamp assembly for clamping to the inlet tube on the container, said second portion comprising first and second semi-cylindrical segments connected together on one side by a hinge and adapted to be latched together on another side by at least one latch that causes the clamp assembly to be clamped over an outer surface of the inlet tube;
    wherein the first semi-cylindrical segment is fixed relative to said first cylindrical portion, and the second semi-cylindrical segment is connected to said first semi-cylindrical segment by the hinge which allows the second semi-cylindrical segment to pivot relative to said first semi-cylindrical segment about an axis that extends parallel with a longitudinal axis of said clamp assembly and said inlet tube.

2. The mower according to claim 1, wherein said at least one latch comprises a snap down toggle style latch.

3. The mower according to claim 1, wherein said at least one latch comprises a pair of latches arranged side-by-side to latch the first and second semi-cylindrical segments together to cause the clamp assembly to be clamped to the inlet tube.

4. The mower according to claim 1, further comprising a seal ring arranged on an inner surface of said adapter to abut against the inlet tube on the container when the adapter is connected to the inlet tube, said seal ring creating a smooth inner surface and a seal between said adapter and a front edge of said inlet tube.

5. The mower according to claim 1, wherein said hinge comprises a continuous hinge having a pivot axis that extends parallel with the longitudinal axis of said clamp assembly and said inlet tube.

6. The mower according to claim 1, wherein said at least one latch comprises a first latch structure connected to one of the semi-cylindrical segments and a second latch structure connected to the other one of the semi-cylindrical segments.

7. The mower according to claim 6, wherein said first latch structure comprises a clamping member and said second latch structure comprises a catch bracket, said first and second latch structures are adapted to be mated together, and said first latch structure is moveable between a first clamped position and a second released position, said first latch structure being in an over-center condition in said first clamped position to hold the clamp assembly closed, and wherein said adapter is easily removable from said inlet tube on the container when said first latch structure is in its released position.

8. The mower according to claim 1, wherein said second portion of said adapter is disposed at an angle relative to said first cylindrical portion of said adapter to accommodate an angle of said inlet tube on the container.

9. The mower according to claim 1, wherein said first cylindrical portion of the adapter has approximately the same outer diameter as the outer surface of said inlet tube, and said second portion of the adapter has approximately the same inner diameter as an inner diameter of the transfer hose.

10. In a mower having a mower deck, a container for collecting grass clippings, leaves and other debris, and a flexible transfer hose that extends between the mower deck and an inlet tube on the container, a quick connect hose adapter for connecting the transfer hose to the container, the adapter comprising:
    a first cylindrical portion fixed in one end of the hose by a hose clamp extending around an outer surface of the hose; and
    a second portion comprising a clamp assembly for clamping to the inlet tube on the container, said clamp assembly comprising first and second semi-cylindrical segments connected together on one side by a hinge and adapted to be latched together on another side by at least one latch that causes the clamp assembly to be clamped over an outer surface of the inlet tube;

wherein the first semi-cylindrical segment is fixed relative to said first cylindrical portion, and the second semi-cylindrical segment is connected to said first semi-cylindrical segment by the hinge which allows the second semi-cylindrical segment to pivot relative to said first semi-cylindrical segment about an axis that extends parallel with a longitudinal axis of said clamp assembly and said inlet tube.

11. The quick connect hose adapter according to claim 10, wherein said at least one latch comprises a snap down toggle style latch.

12. The quick connect hose adapter according to claim 10, wherein said at least one latch comprises a pair of latches arranged side-by-side to latch the first and second semi-cylindrical segments together to cause the clamp assembly to be clamped to the inlet tube.

13. The quick connect hose adapter according to claim 10, further comprising a seal ring connected to an inner surface of said adapter to abut against the inlet tube on the container when the adapter is connected to the inlet tube, said seal ring creating a smooth inner surface and a seal between said adapter and an edge of said inlet tube.

14. The quick connect hose adapter according to claim 10, wherein said hinge comprises a continuous hinge having a pivot axis that extends parallel with the longitudinal axis of said clamp assembly and said inlet tube.

15. The quick connect hose adapter according to claim 10, wherein said at least one latch comprises a first latch structure connected to one of the semi-cylindrical segments and a second latch structure connected to the other one of the semi-cylindrical segments.

16. The quick connect hose adapter according to claim 15, wherein said first latch structure comprises a clamping member and said second latch structure comprises a catch bracket, said first and second latch structures are adapted to be mated together, and said first latch structure is moveable between a first clamped position and a second released position, said first latch structure being in an over-center condition in said first clamped position to hold the clamp assembly closed, and wherein said adapter is easily removable from said inlet tube on the container when said first latch structure is in its released position.

17. The quick connect hose adapter according to claim 10, wherein said second portion of said adapter is disposed at an angle relative to said first cylindrical portion of said adapter to accommodate an angle of said inlet tube on the container.

18. The quick connect hose adapter according to claim 10, wherein said first cylindrical portion of the adapter has approximately the same outer diameter as the outer surface of said inlet tube, and said second portion of the adapter has approximately the same inner diameter as an inner diameter of the transfer hose.

* * * * *